(12) United States Patent
Smith

(10) Patent No.: US 6,732,233 B2
(45) Date of Patent: May 4, 2004

(54) HOT SPARE RELIABILITY FOR STORAGE ARRAYS AND STORAGE NETWORKS

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 10/152,430

(22) Filed: May 21, 2002

(65) Prior Publication Data

US 2003/0221057 A1 Nov. 27, 2003

(51) Int. Cl.[7] .............................................. G06F 12/00
(52) U.S. Cl. ................................ 711/114; 714/7; 714/6
(58) Field of Search ............................... 711/114; 714/5, 714/6, 7

(56) References Cited

U.S. PATENT DOCUMENTS

| | | | | | |
|---|---|---|---|---|---|
| 5,331,646 | A | * | 7/1994 | Krueger et al. ............. | 714/766 |
| 5,666,512 | A | * | 9/1997 | Nelson et al. ............... | 711/114 |
| 5,961,651 | A | * | 10/1999 | Gittins et al. ................ | 714/5 |
| 6,223,252 | B1 | * | 4/2001 | Bandera et al. ............. | 711/114 |
| 6,334,195 | B1 | * | 12/2001 | DeKoning et al. ........... | 714/7 |
| 2003/0041283 | A1 | * | 2/2003 | Murphy et al. .............. | 714/13 |
| 2003/0088803 | A1 | * | 5/2003 | Arnott et al. ................ | 714/5 |
| 2003/0115412 | A1 | * | 6/2003 | Franklin et al. ............. | 711/114 |

* cited by examiner

Primary Examiner—Hiep T. Nguyen
(74) Attorney, Agent, or Firm—James R. Nock

(57) ABSTRACT

A method and apparatus for improving the reliability of hot spare disk drives in disk arrays and storage networks is provided. The invention analyzes commands issued to active disk drives in a disk array/storage network, and issues commands to the hot spare drives which attempt to emulate the track usage patterns of the active drives. The track usage patterns can be inferred from examining logical block addresses (LBA) of data stored to the active drives, and/or the ratio of read versus write commands issued to the disk drives. By emulating track usage patterns of the active drives, the spare drives have a roughly equivalent lubricant distribution to that of the active disk drives. This provides increased reliability when the hot spare drives are called into active service.

20 Claims, 3 Drawing Sheets

HOT SPARE RELIABILITY FOR STORAGE ARRAYS AND STORAGE NETWORKS

FIELD OF THE INVENTION

The present invention relates generally to disk drive systems, and more specifically to an apparatus and method for improving the reliability of hot spare disk drives in a storage array/storage network.

BACKGROUND OF THE INVENTION

RAID (Redundant Array of Independent Disks) is a set of methods and algorithms for combining multiple disk drives (i.e., a storage array) as a group in which attributes of the multiple drives are better than the individual disk drives. RAID can be used to improve data integrity (i.e., reduce the risk of losing data due to a defective or failing disk drive), cost, and/or performance.

RAID was initially developed to improve I/O performance at a time when computer CPU speed and memory size was growing exponentially. The basic idea was to combine several small inexpensive disks (with many spindles) and stripe the data (i.e., split the data across multiple drives), such that reads or writes could be done in parallel. To simplify the I/O management, a dedicated controller would be used to facilitate the striping and present these multiple drives to the host computer as one logical drive.

The problem with this approach was that the small, inexpensive PC disk drives of the time were far less reliable than the larger, more expensive drives they replaced. An artifact of striping data over multiple drives is that if one drive fails, all data on the other drives is rendered unusable. To compound this problem, by combining several drives together, the probability of one drive out of the group failing increased dramatically.

In order to overcome this pitfall, extra drives were added to the RAID group to store redundant information. In this way, if one drive failed, another drive within the group would contain the missing information, which could then be used to regenerate the lost information. Since all of the information was still available, the end user would never be impacted with down time and the rebuild could be done in the background. If users requested information that had not already been rebuilt, the data could be reconstructed on the fly and the end user would not know about it.

Today there are six base architectures (levels) of RAID, ranging from "Level 0 RAID" to "Level 5 RAID". These levels provide alternative ways of achieving storage fault tolerance, increased I/O performance and true scalability. Three main building blocks are used in all RAID architectures: 1) Data Striping—Data from the host computer is broken up into smaller chunks and distributed to multiple drives within a RAID array. Each drive's storage space is partitioned into stripes. The stripes are interleaved such that the logical storage unit is made up of alternating stripes from each drive. Major benefits are improved I/O performance and the ability to create large logical volumes. Data striping is used in Level 0 RAID. 2) Mirroring—Data from the host computer is duplicated on a block-to-block basis across two disks. If one disk drive fails, the data remains available on the other disk. Mirroring is used in RAID levels 1 and 1+0. 3) Parity—Data from the host computer is written to multiple drives. One or more drives are assigned to store parity information. In the event of a disk failure, parity information is combined with the remaining data to regenerate the missing information. Parity is used in RAID levels 3, 4 and 5.

If a drive fails in a RAID array that includes redundancy—meaning all RAID architectures with the exception of RAID 0—it is desirable to get the drive replaced immediately so the array can be returned to normal operation. There are two reasons for this: fault tolerance and performance. If the drive is running in a degraded mode due to a drive failure, until the drive is replaced, most RAID levels will be running with no fault protection at all: a RAID 1 array is reduced to a single drive, and a RAID 3 or RAID 5 array becomes equivalent to a RAID 0 array in terms of fault tolerance. At the same time, the performance of the array will be reduced, sometimes substantially.

An extremely useful RAID feature that helps alleviate this problem is hot swapping, which when properly implemented, will let a user replace the failed drive immediately without taking down the system. Another approach is through the use of hot spares. Additional drives are attached to the controller and left in a "standby" mode. If a failure occurs, the controller can use the spare drive as a replacement for the bad drive. This simple concept is supported by most RAID implementations. Even many of the inexpensive hardware RAID cards and software RAID solutions support this approach. Typically, the only cost is another hard disk that has to be purchased but cannot be used for storing data.

The main advantage that hot sparing has over hot swapping is that with a controller that supports hot sparing, the rebuild will be automatic. The controller detects that a drive has gone bad, it disables it, and immediately rebuilds the data onto the hot spare. This is a tremendous advantage for anyone managing many arrays, or for systems that run unattended. As features, hot sparing and hot swapping are independent: you can have one, or the other, or both. They will work together, and often are used in that way. However, sparing is particularly important if hot swap (or warm swap) capability is not available, because it will enable a user to get the array back into normal operating mode quickly, delaying the time that the system has to be shut down until it is more convenient. However, when this occurs, the user loses the hot sparing capability in the meantime. When the failed drive is eventually replaced, the new drive becomes the new hot spare.

It has been discovered that hot spares can fail shortly after they are called into action. The reason for this appears to be caused by the distinctly different access patterns used for spares as compared to active drives. Thus, when a spare drive begins using areas of the disk stack not previously accessed during its idle routine, a head crash may result.

In order to address this problem, manufacturers of RAID systems have implemented a "safe mode" for priming the hot spare before it is called into service. In safe mode, when the hot spares are in idle mode, the heads are moved across the disk surfaces at some periodic interval. The problem with safe mode is that it does not emulate the track utilization present in the active drives of an array.

There is a need for a more realistic apparatus and method to prime a hot spare drive prior to use. The apparatus and method should emulate the track utilization present in the active drives of the array prior to being called into service.

The details of the present invention, both as to its structure and operation, can best be understood in reference to the accompanying drawings, in which like reference numerals refer to like parts.

SUMMARY

A method and apparatus for improving the reliability of hot spare disk drives in disk arrays and storage networks is provided. In a preferred embodiment, the present invention intercepts commands issued to active disk drives in a disk array/storage network, analyzes the commands, and issues commands to the hot spare drives which attempt to emulate the track usage patterns of the active drives. The track usage patterns can be inferred from examining logical block addresses (LBA) of data stored to the active drives, and/or the ratio of read versus write commands issued to the active disk drives. By emulating track usage patterns of the active drives, the hot spare drives have a roughly equivalent lubricant distribution to that of the active disk drives. This provides increased reliability when the hot spare drives are later called into active service.

The present invention also provides a storage array/storage network apparatus having a plurality of active disk drives for storing data. The storage array/storage network apparatus also provides one or more hot spare disk drives for replacing any of the active disk drives if a failure occurs on any of the active disk drives during normal operation. The storage array/storage network further provides a storage array controller which provides commands to the hot spare drives during normal operation. The commands provided to the hot spare drives from the storage array controller produce track usage patterns similar to track usage patterns produced for the active disk drives during normal operation.

In one embodiment, the commands provided to the hot spare drives are derived by a statistical analysis performed on commands provided to the plurality of active drives during normal operation. The statistical analysis may include, but is not limited to, estimating track usage patterns from the logical block addresses (LBA) of commands sent to the active drives, and/or the ratio of read versus write commands sent to the active drives. In yet another embodiment, every 1 of N commands provided to the plurality of active drives are also directed to the hot spare drives.

In one embodiment of the present invention, The storage array controller begins providing commands to the hot spare drives only when a set of predictive failure analysis (PFA) measurements from at least one of the plurality of active disk drives indicate that a disk drive failure is probable in the near future. In another embodiment, the storage array controller ceases to provide command to the hot spare disk drives if a predictive failure analysis performed on a hot spare disk drive indicates that a failure is likely in the near future.

The details of the present invention, both as to its structure and operation, can best be understood in reference to the accompanying drawings, in which like reference numerals refer to like parts.

DETAILED DESCRIPTION OF THE PREFERRED EMBODIMENTS

Figure 1:
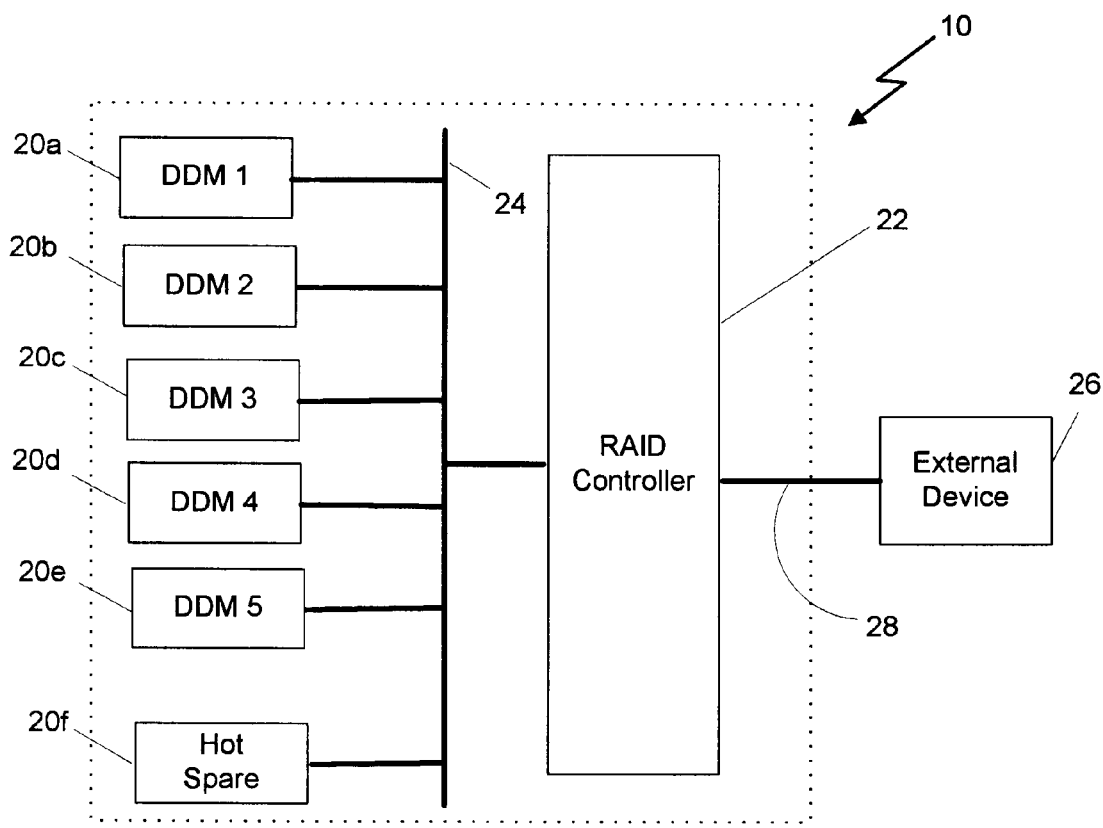
FIG. 1 is an illustration of a simple RAID storage array.

Turning to the Drawings, wherein like numbers denote like parts throughout the several views, FIG. 1 is a high level illustration of a Redundant Array of Inexpensive Disks (RAID) storage array, shown generally at 10. RAID storage array 10 communicates with an external device 26 (e.g., a computer server) via interface 28. A plurality of disk drive modules (DDMs) 20a, 20b, 20c, 20d, and 20e are attached to a RAID controller 22 via a bus 24. RAID storage array 10 also includes one or more hot spare drives 20f. Hot spare drive 20f is connected to RAID storage array 10, but is held in reserve in case a DDM 20a, 20b, 20c, 20d, and 20e fails. In a preferred embodiment, bus 24 is a SCSI bus, but several alternative bus types may be utilized (e.g., Fibre Channel) and still remain within the scope and spirit of the present invention. RAID array 10 can be part of a larger storage network.

When a read/write command is issued by external device 26 to RAID storage array 10, RAID controller 22 dispatches the command to DDMs 20a, 20b, 20c, 20d, and 20e. Even though RAID storage array 10 contains multiple DDMs, RAID storage array appears to external device 26 as a single storage unit. Depending upon the type of RAID employed within the controller, RAID controller 22 dispatches the storage operation for the single command across the plurality of DDMs 20a, 20b, 20c, 20d, and 20e. In one embodiment, data can be striped across DDMs 20a, 20b, 20c, 20d, and 20e to give more access speed. Alternatively, data can be mirrored across multiple DDMs 20a, 20b, 20c, 20d, and 20e for data security. In yet another embodiment, RAID controller 22 stripes data across DDMs 20a, 20b, 20c, 20d, and 20e and also maintains parity information on the DDMs. RAID storage array 10 also includes one or more hot spare drives 20f, which are deployed if any of the active DDMs encounter a failure.

In some prior art systems, hot spare drive 20f remains idle during the normal operation of DDMs 20a, 20b, 20c, 20d, and 20e within RAID storage array 10. In these systems, hot spare drive 20f only becomes active if a failure occurs on one of the DDMs during normal operation. In other prior art systems, hot spare drive 20f operates in a "safe mode", where the heads of the drive are moved across the surfaces of the disk at some periodic interval. In both instances, hot spare drive 20f does not receive the same sort of disk activity and track usage patterns encountered by DDMs 20a, 20b, 20c, 20d, and 20e during normal operation. As a result, hot spare drive 20f does not have an equivalent lubricant distribution to that of DDMs 20a, 20b, 20c, 20d, and 20e. When hot spare drive 20f begins using areas of the disk stack not previously accessed during its idle routine, the probability of a head crash is substantially increased.

The present invention improves upon prior art systems, in that it analyzes track usage patterns for DDMs 20a, 20b, 20c, 20d, and 20e during normal operation, and attempts to send commands to hot spare drive 20f which attempt to emulate the track usage patterns of DDMs. In this way, hot spare drive 20f is "primed" so that it has a usage pattern and lubricant distribution similar to that of the active DDMs 20a, 20b, 20c, 20d, and 20e.

Figure 2:
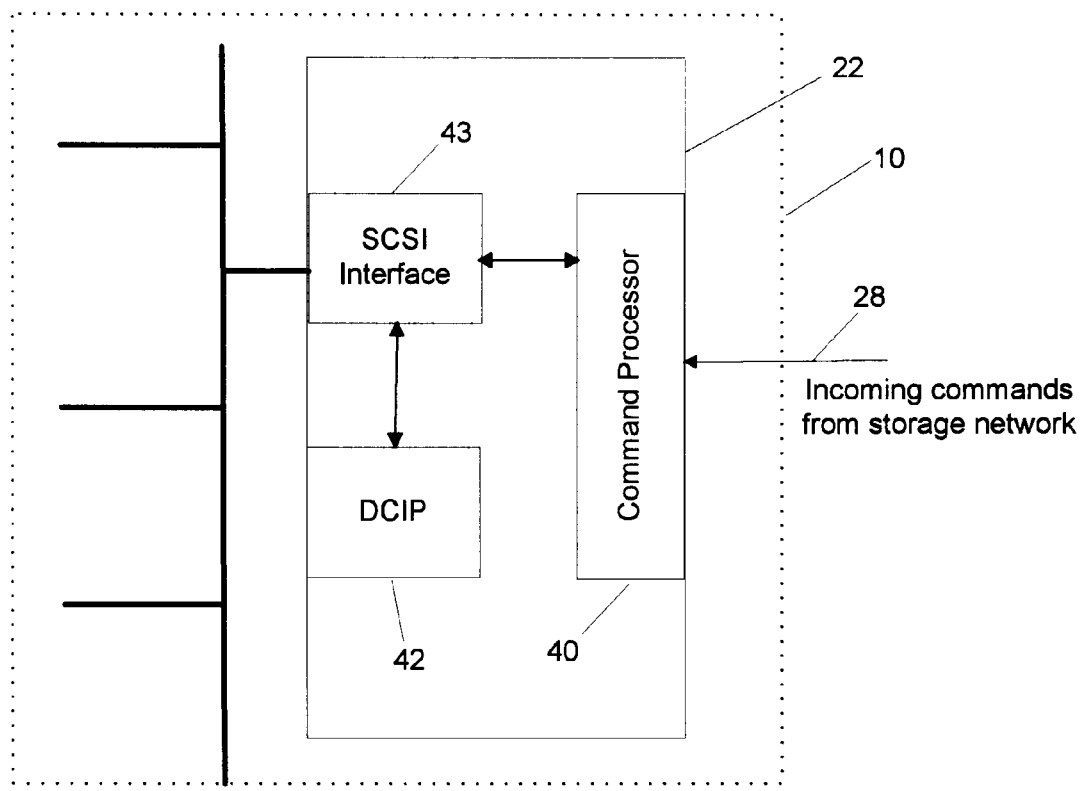
FIG. 2 is an illustration of a RAID controller.

FIG. 2 illustrates RAID controller 22 in more detail. At the highest level, RAID controller 22 intercepts commands being sent to active DDMs 20a, 20b, 20c, 20d, and 20e, analyzes the commands, and calculates which commands should be sent to the hot spare drive 20f.

As shown in FIG. 2, a command processor 40 within RAID controller 22 communicates with a DDM command interception process (DCIP) 42 via SCSI interface 43. This allows DCIP 42 to send back to command processor 40 via SCSI interface 43 the commands that should be sent to the hot spare drive 20f. The commands from DCIP 42 may be sent immediately to hot spare drive 20f, or may be queued and sent at a more convenient time (i.e., depending on current workload).

DCIP 42 has several possible functions. First, DCIP 42 provides analysis of the SCSI read and write commands being sent to active DDMs 20a, 20b, 20c, 20d, and 20e. DCIP 42 also provides cognizance of the different types of DDMs 20a, 20b, 20c, 20d, and 20e (they do not all have to be the same models), and associated logical block address (LBA) to physical mapping for each of the models employed within the RAID storage array 10. Finally, DCIP 42 provides commands for hot spare drive 20f.

DCIP 42 is capable of performing several different types of analysis on the commands being sent to active DDMs 20a, 20b, 20c, 20d, and 20e. At the most general level, DCIP 42 intercepts commands destined for active DDMs 20a, 20b, 20c, 20d, and 20e, then performs a statistical analysis of the commands being sent in order to build a custom set of commands that are sent to hot spare drive 20f. The custom set of commands are constructed to "condition" hot spare drive 20f with usage patterns similar to those generated for active DDMs 20a, 20b, 20c, 20d, and 20e.

One of the key conditioning parameters is track usage. For most disk drives, the track usage can be estimated from the write and read commands sent to a drive. This is because the data on a drive is stored in logical block addresses (LBAs) which are arranged in a more or less linear correspondence to the disk radius. For example, an LBA of 0 is near the outer disk pack diameter and Max_LBA is near the inner disk pack diameter. It is therefore possible to estimate the physical track utilization for similar disk devices on the basis of the LBAs used for writing and for reading.

Another key conditioning parameter is the ratio of write versus read commands issued to a disk drive. It is possible to estimate the fraction of writes versus reads for a disk device since the commands for writing and reading are different. This can be important when the number of writes is significantly greater than the reads. In these instances, the average head flying height is likely to be lower due to head protrusion caused by higher head temperature during writing. This will have a corresponding effect on the lubricant distribution on the drive.

DCIP 42 can consider track usage alone, the ratio of write versus read commands alone, or some combination of both conditioning parameters when analyzing the command stream sent to active DDMs 20a, 20b, 20c, 20d, and 20e. Additional conditioning parameters may be considered alone or in combination with the aforementioned conditioning parameters, and still remain within the scope and spirit of the present invention.

In one embodiment of the present invention, the issuance of commands to hot spare drive 20f is initiated only if results of predictive failure analysis (PFA) measurements performed on active DDMs 20a, 20b, 20c, 20d, and 20e indicate that one or more of the active DDMS are likely to fail in the near future. By definition, PFA monitors key device performance indicators for change over time or exceeding predefined performance limits. The device then notifies the system when an indicator surpasses the predefined performance limit. Since some amount of processing overhead is required of RAID controller to intercept active DDM commands, analyze the commands, and issue emulation commands to hot spare drive 20f, thus it may be desirable to undertake this processing overhead only when a drive failure is likely.

Similarly, in one embodiment of the present invention, the emulation of track usage patterns by hot spare drive 20f is halted if a set of PFA measurements performed on hot spare drive 20f indicate that the hot spare drive is likely to fail.

The concept of conditioning a hot spare drive 20f within a storage array can easily be extended to storage networks, as well. In yet another embodiment of the present invention, the track utilization for a "global hot spare" drive (i.e., a hot spare drive that can be used by any number of disk storage devices in a network) is based on a statistical average of track utilization for the disk storage devices for which it serves as a spare.

Figure 3:
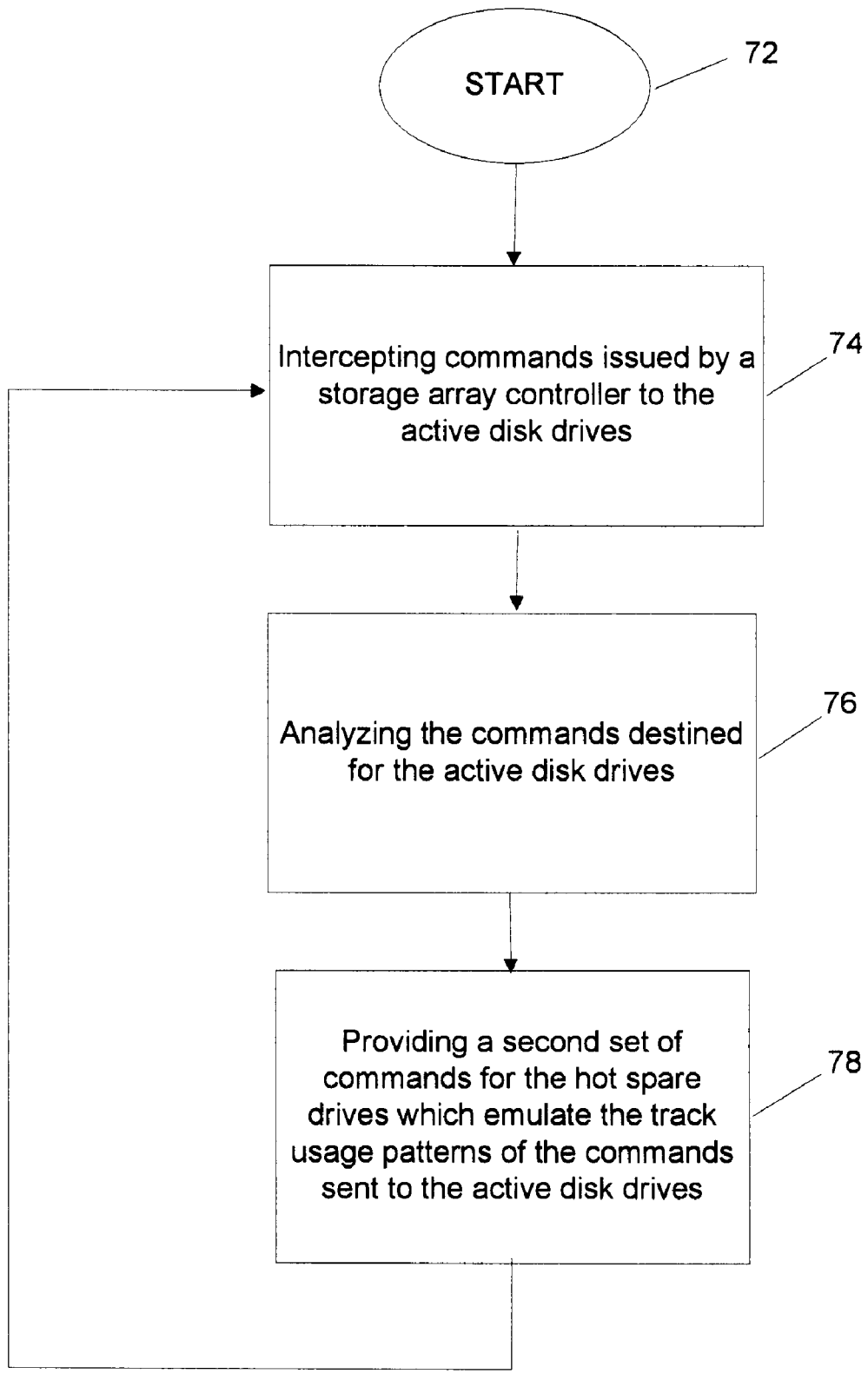
FIG. 3 is a flowchart of a method to precondition a hot spare disk drive in a storage array/storage network.

FIG. 3 illustrates a flow diagram of a method for improving hot spare reliability for storage arrays and storage networks in accordance with the present invention, shown generally at 70. The method begins at block 72. At block 74, a command issued by a storage array (i.e. RAID) controller 22 to the plurality of active DDMs 20a, 20b, 20c, 20d, and 20e in the storage array is intercepted (i.e., the command is still issued to the plurality of active DDMs, but the command is also retained at storage array controller 22 for further analysis).

At block 76, the command destined for active DDMs 20a, 20b, 20c, 20d, and 20e in the storage array is analyzed. At described previously, several different types of analysis are possible. In one instance the analysis involves determining track access patterns for the active DDMs 20a, 20b, 20c, 20d, and 20e by analyzing the logical block address(es) (LBA) of the command provided. In another instance, the ratio of read-to-write commands is determined for commands issued to the active DDMs 20a, 20b, 20c, 20d, and 20e.

After the commands provided to the active DDMs 20a, 20b, 20c, 20d, and 20e have been analyzed, a second set of commands is issued to hot spare drive(s) 20f which emulate the track usage patterns of the commands sent to the active DDMs 20a, 20b, 20c, 20d, and 20e, as shown at block 78. In one instance, the commands sent to the hot spare drive(s) 20f are chosen based on an LBA analysis, or an analysis of the read-to-write commands as described previously. In another instance, the commands issued to the hot spare drive(s) 20f are simply a subset of the commands issued to the active DDMs 20a, 20b, 20c, 20d, and 20e (i.e., every 1 of N commands set to the active DDMs are also sent to the hot spare drives). In one embodiment, the second set of commands is provided to the hot spare drive(s) 20f only when a set of predictive failure analysis (PFA) measurements indicate that a drive failure is likely on one or more active DDMs 20a, 20b, 20c, 20d, and 20e in the near future. In another embodiment, the invention ceases to provide the second set of commands to the hot spare disk drive(s) 20f if a PFA performed on the hot spare drive(s) indicates that a failure is likely in the near future.

Additional modifications may be made to the illustrated embodiments without departing from the spirit or scope of the invention. Therefore, the invention lies in the claims hereinafter appended.

What is claimed is:

1. A storage array, comprising:
    a plurality of active disk drives for storing data;
    one or more hot spare disk drives for replacing one or more of the plurality of active disk drives if a disk drive failure occurs on at least one of the active disk drives during normal operation; and
    a storage array controller for providing commands to the one or more hot spare disk drives during normal operation of the plurality of active disk drives, wherein the commands provided to the one or more hot spare disk drives produce track usage patterns similar to track usage patterns produced for the plurality of active disk drives during normal operation.

2. The storage array of claim 1, wherein the commands provided to the one or more hot spare disk drives are derived by a statistical analysis performed on commands provided to the plurality of active disk drives during normal operation.

3. The storage array of claim 2, wherein the track usage patterns for the one or more hot spare drives are estimated from the logical block addresses (LBA) of read and write commands sent to the plurality of active drives.

4. The storage array of claim 2, wherein a ratio of read-to-write commands provided to the one or more hot spare disk drives approximates the ratio of read-to-write commands provided to the plurality of active drives.

5. The storage array of claim 1, wherein every 1 of N commands provided to the plurality of active disk drives during normal operation are also directed to the one or more hot spare disk drives.

6. The storage array of claim 1, wherein the storage array controller begins providing commands to the one or more hot spare disk drives only when a set of predictive failure analysis (PFA) measurements from at least one of the plurality of active disk drives indicate that a disk drive failure is probable in the near future.

7. The storage array of claim 1, wherein the storage array controller ceases to provide commands to the one or more hot spare disk drives if a predictive failure analysis (PFA) performed on the one or more hot spare drives indicates that at least one of the one or more hot spare drives is likely to fail in the near future.

8. A storage network, comprising:
a plurality of active disk drives distributed across the storage network for storing data;
one or more hot spare disk drives for replacing one or more of the plurality of active disk drives if a disk drive failure occurs on at least one of the active disk drives during normal operation; and
a storage network controller for providing commands to the one or more hot spare disk drives during normal operation of the plurality of active disk drives, wherein the commands provided to the one or more hot spare disk drives produce track usage patterns similar to track usage patterns produced for the plurality of active disk drives during normal operation.

9. The storage network of claim 8, wherein the commands provided to the one or more hot spare disk drives are derived by a statistical analysis performed on commands provided to the plurality of active disk drives during normal operation.

10. The storage array of claim 9, wherein the track usage patterns for the one or more hot spare drives are estimated from the logical block addresses (LBA) of read and write commands sent to the plurality of active drives.

11. The storage array of claim 9, wherein a ratio of read-to-write commands provided to the one or more hot spare disk drives approximates the ratio of read-to-write commands provided to the plurality of active drives.

12. The storage array of claim 8, wherein every 1 of N commands provided to the plurality of active disk drives during normal operation are also directed to the one or more hot spare disk drives.

13. The storage array of claim 8, wherein the storage network controller begins providing commands to the one or more hot spare disk drives only when a set of predictive failure analysis (PFA) measurements from at least one of the plurality of active disk drives indicate that a disk drive failure is probable in the near future.

14. The storage array of claim 8, wherein the storage network controller ceases to provide commands to the one or more hot spare disk drives if a predictive failure analysis (PFA) performed on the one or more hot spare drives indicates that at least one of the one or more hot spare drives is likely to fail in the near future.

15. A method for improving the reliability of one or more hot spare disk drives in a storage array having a plurality of active disk drives and a storage array controller, comprising the steps of:
intercepting a first set of commands issued by a storage array controller to the plurality of active disk drives;
analyzing the first set of commands; and
providing a second set of commands for the one or more hot spare disk drives, wherein the second set of commands emulates track usage patterns of the first set of commands issued to the plurality of active disk drives.

16. The method of claim 15, wherein the step of analyzing the first set of commands further comprises the step of:
determining track access patterns for the plurality of active disk drives by determining the logical block addresses (LBA) of the first set of commands provided to the plurality of active disk drives.

17. The method of claim 15, wherein the step of analyzing the first set of commands further comprises the step of:
determining the ratio of read-to-write commands in the first set of commands provided to the plurality of active disk drives.

18. The method of claim 15, wherein the step of providing a second set of commands for the one or more hot spare disk drives further comprises:
providing every 1 of N of the first set of commands as the second set of commands.

19. The method of claim 15, wherein the step of providing a second set of commands for the one or more hot spare disk drives further comprises:
providing the second set of commands only when a set of predictive failure analysis (PFA) measurements from at least one of the plurality of active disk drives indicate that a disk drive failure is probable in the near future.

20. The method of claim 15, wherein the step of providing a second set of commands for the one or more hot spare disk drives further comprises:
ceasing to provide the second set of commands for the one or more hot spare disk drives if a predictive failure analysis (PFA) performed on the one or more hot spare drives indicates that at least one or more of the hot spare drives is likely to fail in the near future.

* * * * *